(12) United States Patent
Sato

(10) Patent No.: US 7,277,935 B2
(45) Date of Patent: Oct. 2, 2007

(54) MANAGEMENT METHOD FOR NETWORK DEVICE

(75) Inventor: Takayuki Sato, Tokyo (JP)

(73) Assignee: Allied Telesis Holdings K.K., Shinagawa-ku, Tokyo (*) Notice: Subject to any disclaimer, the term of this patent is extended or adjusted under 35 U.S.C. 154(b) by 917 days.

(21) Appl. No.: 10/160,279

(22) Filed: May 30, 2002

(65) Prior Publication Data
US 2003/0012182 A1 Jan. 16, 2003

(30) Foreign Application Priority Data
Jul. 21, 2001 (JP) ............... 2001-211896

(51) Int. Cl.
G06F 15/173 (2006.01)
(52) U.S. Cl. ................ 709/223; 709/224; 370/229
(58) Field of Classification Search ........ 709/223, 709/224; 370/229
See application file for complete search history.

(56) References Cited

U.S. PATENT DOCUMENTS

| 5,875,306 A | 2/1999 | Bereiter et al. | |
|---|---|---|---|
| 6,654,802 B1 * | 11/2003 | Oliva et al. ............. | 709/224 |
| 2002/0181395 A1 * | 12/2002 | Foster et al. ............ | 370/229 |

FOREIGN PATENT DOCUMENTS

| JP | 02153776 A | 6/1990 |
|---|---|---|
| JP | 04296136 A | 10/1992 |
| JP | 05300152 A | 11/1993 |
| JP | 08032607 A | 2/1996 |
| JP | 08191326 A | 7/1996 |
| JP | 11146003 A | 5/1999 |
| JP | 2000-031992 | 1/2000 |
| JP | 2000-090028 | 3/2000 |
| JP | 2000-209237 | 7/2000 |

OTHER PUBLICATIONS

Office Action issued from the Japanese Patent Office for corresponding Japanese Patent Application No. 2001-211896 and English translation.
Siegl, et al., "Hierarchical network management: a concept and its prototype in SNMPv2" *Computer Networks and ISDN Systems, North Holland Publishing*, 28(4):441-452. (1996).
Stallings, "SNMP and SNMPV2: The Infrastructure for Network Management" *IEEE Communications Magazine*, 36(3):37-43 (1998).

* cited by examiner

*Primary Examiner*—Jason Cardone
*Assistant Examiner*—Adnan M. Mirza
(74) *Attorney, Agent, or Firm*—Knobbe, Martens, Olson & Bear, LLP

(57) ABSTRACT

There is provided a method and system for performing an initial setting on a network device. The network system includes one or more interconnecting devices that are connected to a network, a target device to be managed that is connected to one of the interconnecting devices via a port, and a management device that manages the target device based upon a port identifier for identifying the port.

2 Claims, 16 Drawing Sheets

FIG. 3A

| NETWORK APPARATUS INFORMATION | | | CONNECTION INFORMATION | | CONFIGURATION INFORMATION | | | |
|---|---|---|---|---|---|---|---|---|
| MAC Address | IP Address | Device Type Information | Connected Relay Device | Port | Configuration File | Configuration Procedure | State | Instruction |
| 11-22-33-44-55-66 | 192.168.1.1 | L2switch2 | switch1-1 | 12 | d:\backup\switch1-1-12.cnf | tftpTypeA | Backed Up | Periodical Backup |
| - | - | - | switch1-1 | 10 | d:\backup\switch1-1-10.cnf | ftpTypeB | Not configured | - |
| 12-34-56-78-9A-BC | 192.168.1.11 | WebServer1 | switch1-2 | 3 | - | - | Initial State | Backup on Change |
| .. | .. | .. | .. | .. | .. | .. | .. | .. |

| APPARATUS TYPE INFORMATION | CONFIGURATION FILE | CONFIGURATION PROCEDURE |
|---|---|---|
| L2switch1 | d:\common\L2switch1.cnf | tftpTypeA |
| L2switch2 | d:\common\L2switch2.cnf | tftpTypeB |
| WebServer1 | d:\common\WebServer1.cnf | ftpTypeA |
| .. | .. | .. |

17

MANAGEMENT METHOD FOR NETWORK DEVICE

BACKGROUND OF THE INVENTION

1. Field of the Invention

This invention relates to management of a communications apparatus. This invention is suitably applicable for example to initial settings by a management device on a network device such as a hub and a router connected to a network.

2. Description of the Related Technology

The widespread use of local area networks (LANs) and wide area networks (WANs) in recent years has allowed a great many personal computers (hereinafter referred to as PCs), hubs, switches, routers and other types of network devices (among which an intelligent hub or the like may be called "agent") to get connected to networks and subnetworks thereof, where information is shared and transmitted in high traffic volume. Distributed environments in management of configuration, performance, security, and billing in the network make it difficult and costly to locate possible problems. Therefore, there has arisen a need for centralized management of network status conditions.

In order to perform network management, a management device (which may also be called "manager" or "server") monitors a connection status and traffic in network devices. The management device obtains communication parameters and other information pertaining to the network devices, and sets management information on the network devices. The communication parameters, which can include IP (Internet Protocol) addresses and the like, are used to enable communications capabilities of a network device, and to make the network device manageable to the manager. The management information is used to manage the network device, and includes information common to all the network devices and information unique to the types of the network devices. In the description of the present application, the initial setting of the management information may in some instances be referred to as "initial configuration".

Among conventionally proposed methods for setting communication parameters on the network device has been a manual setting using serial data communications. This is a method in which a terminal is connected with a target agent via an RS-232C interface so as to enter commands for directly setting communication parameters. However, where tens or hundreds of network devices are connected to the network, as in recent network environments which include increased capabilities of LANs and WANs, the configuration load becomes burdensome. Accordingly, another method using communications protocols such as BOOTP (BOOTstrap Protocol), DHCP (Dynamic Host Configuration Protocol), TFTP (Trivial File Transfer Protocol) has been proposed in which a server (e.g., DHCP server) automatically sets the communication parameters upon startup. The management device is in many instances provided independently of the DHCP server for the purpose of distributing the DHCP servers that set IP addresses and the like.

Conventionally, however, the initial setting of the network device is not so easy. An initial configuration file might conceivably be transferred to the network device through BOOTP, DHCP, and TFTP in combination, but each network device could not be identified through these protocols. Therefore, in such an environment where different types of apparatuses coexist, management information unique to the network device could not be set. On the other hand, a MAC (Media Access Control) address of each apparatus could be manually input in the management device, and the management information unique to the apparatus could be set based upon the MAC address. However, inputting the MAC addresses is burdensome, and when the apparatus fails and is replaced, its MAC address also changes. Thus, a new MAC address would need to be input into the network configuration information.

Accordingly, the present invention addresses the need for a method and system for performing an initial setting on a network device with relative ease.

SUMMARY OF CERTAIN INVENTIVE EMBODIMENTS

A network system as one aspect of the present invention comprises one or more interconnecting devices connected to a network; a target device connected to one of the interconnecting devices via a port; and a management device that manages the target device based upon a port identifier. According to this network system, the management device manages the target device based upon the port identifier on the premise that a failure and replacement of the target device may change an address but will not change the port identifier of the interconnecting device. The management may include not only monitoring a connection status and traffic but also performing an initial setting on the target device. Therefore, the management device may perform an initial setting by applying management information to an original and replacement target device. The interconnecting device and the target device can be, for example, a hub, a router, a relay device, or a switch.

A server may be included which sets an address on the network at the target device. This results in separation of the server and the management device, serving to realize a distributed server arrangement, or the like.

The above interconnecting device may include a detector that detects power-up of the target device, and a processor that notifies the management device of the port identifier when the detector detects the power-up of the target device. This allows the management device to recognize power-up of the target device and to obtain the port identifier.

In another aspect of the invention, the above management device may include a memory for storing network device information including the address of the target device on the network, device type information indicating a type of the target device, connection information including identifying information for the interconnecting device and the port identifier, and configuration information for managing the target device. This allows the management device to utilize the previously stored configuration information even when the target device is replaced. Moreover, the management device may include a processor that updates the configuration information stored in the memory, if the management device determines that a predetermined condition is satisfied. The predetermined condition may be such that an administrator of the management device provides instruction to do so, a specified time passes, or the administrator changes the device setting. This allows the memory to keep the configuration information updated at all times. Further, the management device can include a processor that sets the configuration information stored in the memory at the target device, in the event the management device determines that a predetermined condition is satisfied. The predetermined condition may include cases, for example, where the target device fails and is replaced with a new target device. As a result, the management device may dispense with an unnecessary address allocation and initial configuration.

A management method as another aspect of the present invention comprises providing, via one or more interconnecting devices connected to a network, an address of a target device which is connected to one of the interconnecting devices, or a port identifier for identifying a port of the target device which is connected to one of the interconnecting devices via a port of one of the interconnecting devices, for a management device that is connected to the network so as to manage the target device; and the management device managing the target device based upon the provided address. According to this management method, the management device manages the target device based upon the address or port identifier provided from the interconnecting device. This allows the address or port identifier to be automatically provided from the interconnecting device to the management device, and thus facilitates the management including initial configuration. The operation of management performed by the management device using the port identifier can be the same as that of the above network system.

In yet another aspect of the invention, the management method may further include the receiving, at the management device, of a setting request for configuration information for managing the target device and the address of the target device, and identifying, at the management device, the address of the target device by comparing the address provided via the one or more interconnecting devices and the address received at the management device with the setting request. This allows the management device to set the configuration information at the target device upon receiving a setting request. The setting request does not have to be generated by the management device. Receiving a setting request may include the target device transmitting the setting request to the interconnecting device, and the interconnecting device transferring the setting request to the management device and providing the address of the target device for the management device. In other words, in this case, the target device notifies the management device of the setting request and the address of the target device via the interconnecting device. This is because the target device in many instances has no information about the address of the management device prior to configuration.

In another aspect of the invention, providing an address of the target device may further provide an address of the target device on the network for the management device, and the management method may further include receiving, at the management device, a setting request for managing the target device and the address of the target device, and identifying, at the management device, the port identifier of the target device by comparing the address on the network and the address received at the management device. This allows the management device to set the configuration information at only the target device upon a setting request. The above receiving step may include the target device transmitting the setting request to the interconnecting device, and the interconnecting device transferring the setting request to the management device and providing the address of the target device and the port identifier for the management device. In other words, in this case, the target device notifies the management device of the setting request, the address, and the port identifier via the interconnecting device. This is because the target device in many instances has no information about the address of the management device prior to configuration. Receiving a setting request may comprise the management device communicating with a server to obtain an address of the target device to set the address of the target device on the network. In this case, the management device obtains an address of the target device from an address assignment server such as a DHCP server. The setting request does not have to be generated by the target device. Since the management device usually sets configuration information after the server assigns an address, the server may further provide a setting request to the management device.

The target device address can be, for example, an IP address or a MAC address.

Upon receiving a setting request, the management device may further receive device type information that indicates a type of the target device. This allows the management device to perform management according to the type of the device.

A management method, as yet another aspect of the present invention, is a method by which a target device, connected to an interconnecting device which is connected to a network, is managed on the network. The method comprises setting network device information, including an address of the target device on the network, device type information for identifying a type of the target device, setting connection information, including identifying information of the interconnecting device and a port identifier, setting configuration information for managing the target device, and creating a comparative table of the network device information, the connection information, and the configuration information. This method may include creating a comparative table and thereby allowing communication parameters of multiple communications apparatuses to be managed at one location. The method may further include setting the configuration information at the target device or managing the target device based upon the port identifier. In addition, these methods may be implemented via a program stored on a computer readable medium.

An interconnecting device connected to a network, as yet another aspect of the present invention, comprises a detector that detects power-up of a target device which is connected to the interconnecting device, and a processor that notifies a management device, which is connected to the network to manage the target device, of an address of the target device when the detector detects the power-up of the target device. The target device may be connected to the interconnecting device via a port of the interconnecting device, and the processor may further notify the management device of a port identifier for identifying the port when the detector detects the power-up of the target device. Moreover, a program that executes a control method implemented by the interconnecting device may be incorporated into the interconnecting device for controlling the functions of the interconnecting device elements. The program may be stored and distributed in a recordable medium, or may be distributed and updated online via a network such as the Internet.

Other features of the present invention will become readily apparent from the following description of preferred embodiments with reference to accompanying figures.

BRIEF DESCRIPTION OF THE DRAWINGS

FIG. 3 is one embodiment of a management table stored in a memory of the management device as shown in FIG. 2.

DETAILED DESCRIPTION OF CERTAIN EMBODIMENTS

The following detailed description is directed to certain specific embodiments of the invention. However, the invention can be embodied in a multitude of different ways as defined and covered by the claims. A description will now be given of an exemplary network system 1 with reference to the accompanying figures.

Figure 1:
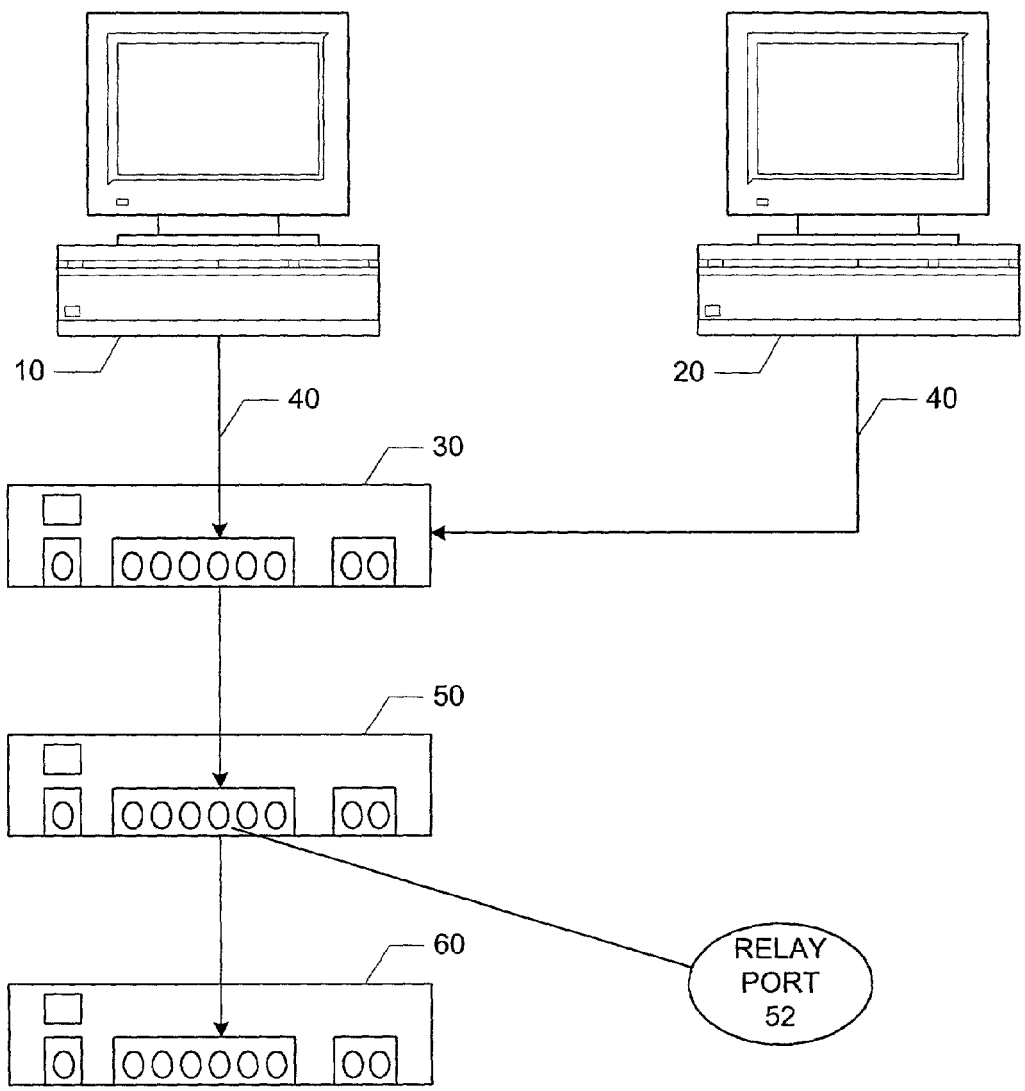
FIG. 1 illustrates an exemplary structure of a network system as may be managed by the present invention.

FIG. 1 is a structural illustration of the network system 1 as may be managed by the present invention. The network system 1 includes, as illustrated, a management device 10, a DHCP server 20, an interconnecting device 30, an Ethernet network 40, and a network device 60.

In conjunction with the present invention, the management device 10 manages the network device 60. To be more specific, the management device 10 manages a status condition and traffic of a connection established between the network device 60 and the other apparatuses, and thereby manages configuration, performance, security, and billing of the Ethernet network 40. In the present embodiment, as will be described later with reference to FIG. 13, the management device 10 manages the network device 60 using SNMP (Simple Network Management Protocol).

In the configuration management, the status conditions of devices constituting the network are monitored, and an operation of each apparatus is controlled. In addition, a firmware version may be acquired for each apparatus. This allows a network administrator to acquire details of the current network configuration (hereinafter referred to as "network configuration") connected to the network and subnetworks thereof.

In the performance management, an administrator measures the performance of the devices constituting the network. The performance management allows the network administrator to monitor the status conditions of traffic of each apparatus to see the network activities as to whether an abnormal packet is transmitted, whether there is a shortcoming in performance of the server, or the like.

In the security management, the use of resources (information and apparatuses) in the network is restricted and controlled to encourage a valid use of these resources. The network administrator periodically investigates an access record of users to find an unauthorized use, or to prevent an unauthorized user from invading the network.

In the billing management, the use statuses of the resources in the network are recorded for each user. The network administrator can thereby obtain the use rates of the network resources for each user so as to issue a warning to a user who abuses the resources or to use such information for providing better services.

Figure 2:
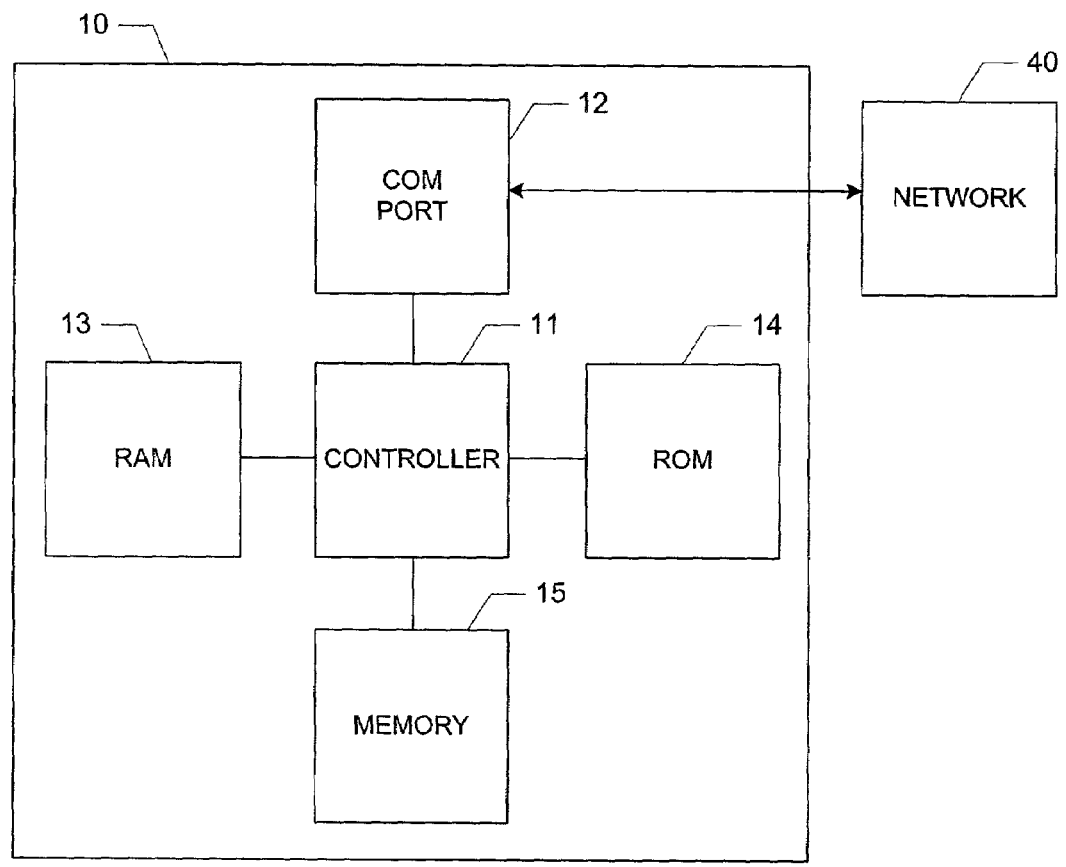
FIG. 2 is a block diagram of one embodiment of a management device of the network system as shown in FIG. 1.

FIG. 2 is a block diagram of one embodiment of the management device 10. The management device 10 in the present embodiment, which is constructed exemplarily as a PC, includes, as shown in FIG. 2, a controller 11, a communication port 12, a RAM (Random Access Memory) 13, a ROM (Read Only Memory 14, and a memory 15. In FIG. 2, input/output devices (e.g., a keyboard, a mouse or other pointing devices) and display devices (e.g., a display monitor, and the like) attached to the management device 10 are not illustrated. Through the input device, an operator of the management device 10 may input data of various kinds in the memory 15, and download software into the RAM 13, and ROM 14 or memory 15.

The controller 11, which can be processors such as a CPU (central processing unit) or an MPU, can control each section of the management device 10. The management device 10 may also be connected to a host (not shown), and the controller 11 may communicate with the host. The controller 11, in conjunction with the present invention, executes a configuration management table creation program stored in the memory 15 to set configuration information of the network device 60, and constructs management tables 16 and 17 as shown, by way of example, in FIGS. 3A and 3B. Moreover, the controller 11 manages the network device 60 via the communication port 12.

The communication port 12 may be a LAN adapter for establishing a connection to the Ethernet network 40, a USB (Universal Serial Bus) port or Firewire port for providing connection to the Internet (via an Internet service provider (ISP)), via a modem, a terminal adapter (TA) through the public telephone network, ISDN (Integrated Services Digital Network), or various types of dedicated transmission lines. The RAM 13 serves to temporarily store data to be read from the ROM 14 or the memory 15, or data to be written in the memory 15 or the like. The ROM 14 serves to store various kinds of software required for the controller 11 to operate, firmware, and other types of software.

Figure 9:
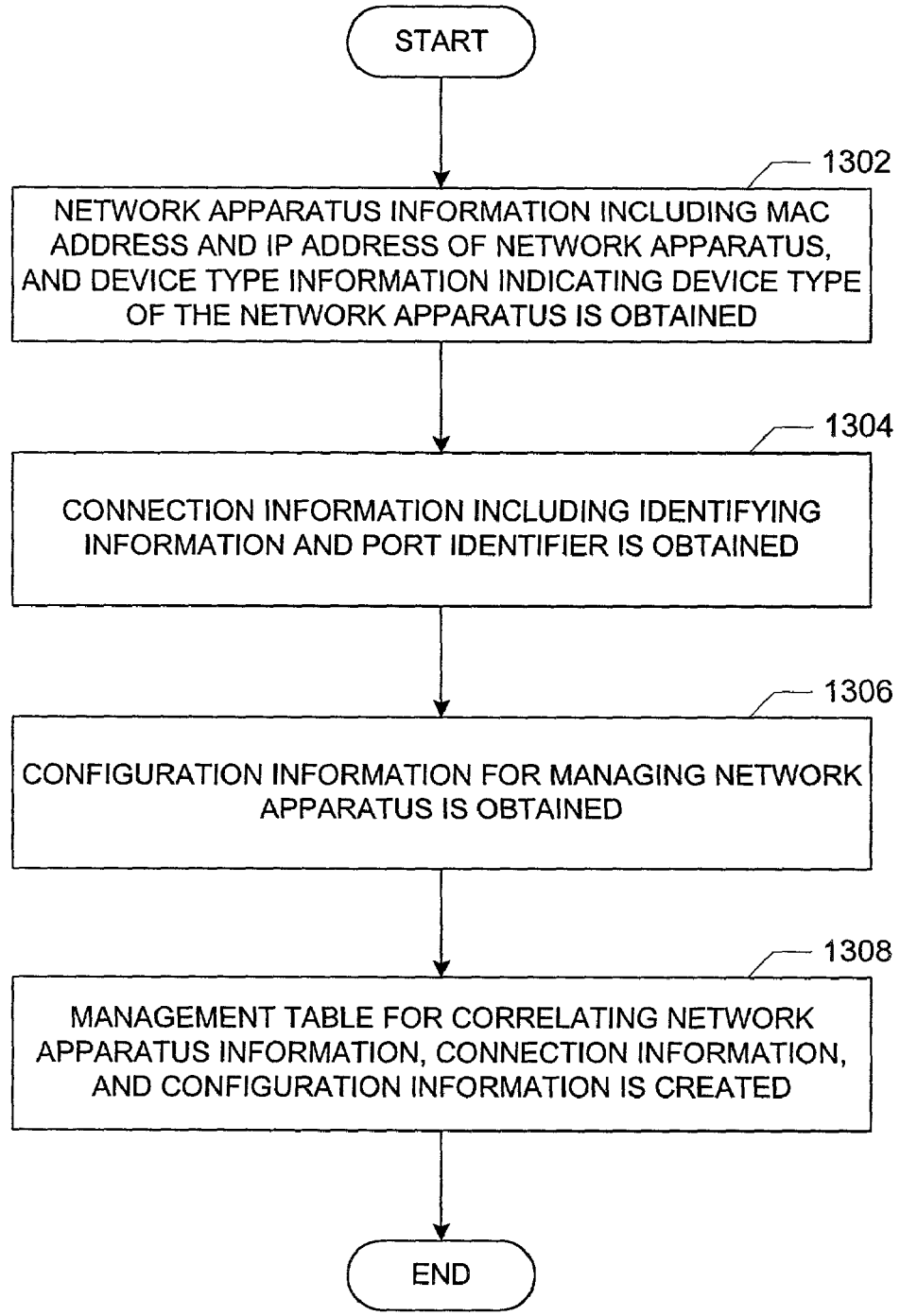
FIG. 9 is a flowchart illustrating one embodiment of operations of the management device of FIG. 2 creating the management table as shown in FIG. 3.

FIGS. 3A and 3B illustrate examples of the management tables 16 and 17. The memory 15 serves to store a management table creation program for creating the management table 16 as shown in FIG. 3A, the management table 17 as shown in FIG. 3B, and the management table 16 as shown in FIG. 9. The management table creation program may be distributed as a separate network software product. Accordingly, the program may be sold in a CD-ROM or other recordable media, or distributed and updated online via a network such as the Internet.

The management table 16 serves as the basis to instruct and manage the network device 60 (or configuration information thereon) connected to a network, or a subnetwork as a segment of the network via the interconnecting devices 30 and 50. This management table 16 allows an inventory management of a plurality of network devices 60 to be performed at one location. In the table, '-' denotes that, for the time being, no data has been obtained or set. The management table 16 represents a relationship among network device information, connection information, and configuration information. The management table 16 differs from the management table 17 in that the configuration information, which varies with the type of the network devices 60, is specifically identified as opposed to identifying the file where the information is stored.

In one embodiment, the network device information includes an IP address and MAC address of the network device 60 on the network, and the device type information for identifying the type of the network device 60.

The IP address is an address that is assigned to computers or network devices connected to a network supporting TCP/IP (Transmission Control Protocol/Internet Protocol), and is represented as a series of numbers in decimal notation separated by periods, each number ranging from 0 to 255. The IP address is included in an IP header provided by the IP protocol arranged in the network layer of the TCP/IP protocol. An IP address of a computer directly connected to the Internet may be obtained from the NIC (Network Information Center). Alternatively, a domain name corresponding to the IP address that is assigned by the DNS (Domain Name System) may be used in place of an IP address.

The MAC address is an address for identifying an information apparatus connected to a LAN, and a hardware address of an interconnecting device located in a communications path for reaching an IP address.

The device type information is, for example, sysObjectID object type in MIB-IL for SNMP that will be described later. The device type information may also be a housing identifier of the network device 60.

The connection information consists of identifying information of the interconnecting device 50 connected with the network device 60, and a port identifier that will be described later. The identifying information of the interconnecting device 50 may be the IP address.

In one embodiment, the configuration information includes a configuration file, configuration procedure, state, and instruction for managing the network device 60.

The configuration file serves to store the management information the management device 10 downloads to the network device 60. The configuration procedure is an identifier for managing a procedure in which the management device 10 downloads information to the network device 60. The procedure can be a protocol, authentication process, or the like. An administrator of the management device 10 may freely select the configuration procedure. A plurality of configuration files may be designated as the configuration file (i.e., in the management tables 16 and 17). The configuration file may be firmware (i.e., software implemented in the network device 60).

However, in one embodiment, the configuration file and the configuration procedure may be, in many instances, copied from another area of the memory 15 in which software used commonly among the types of the network devices 60 and unique software varying with the types, copied from a CD-ROM including a plurality of configuration files for managing the network devices 60, or downloaded from a specific homepage via the Internet.

Figure 14:
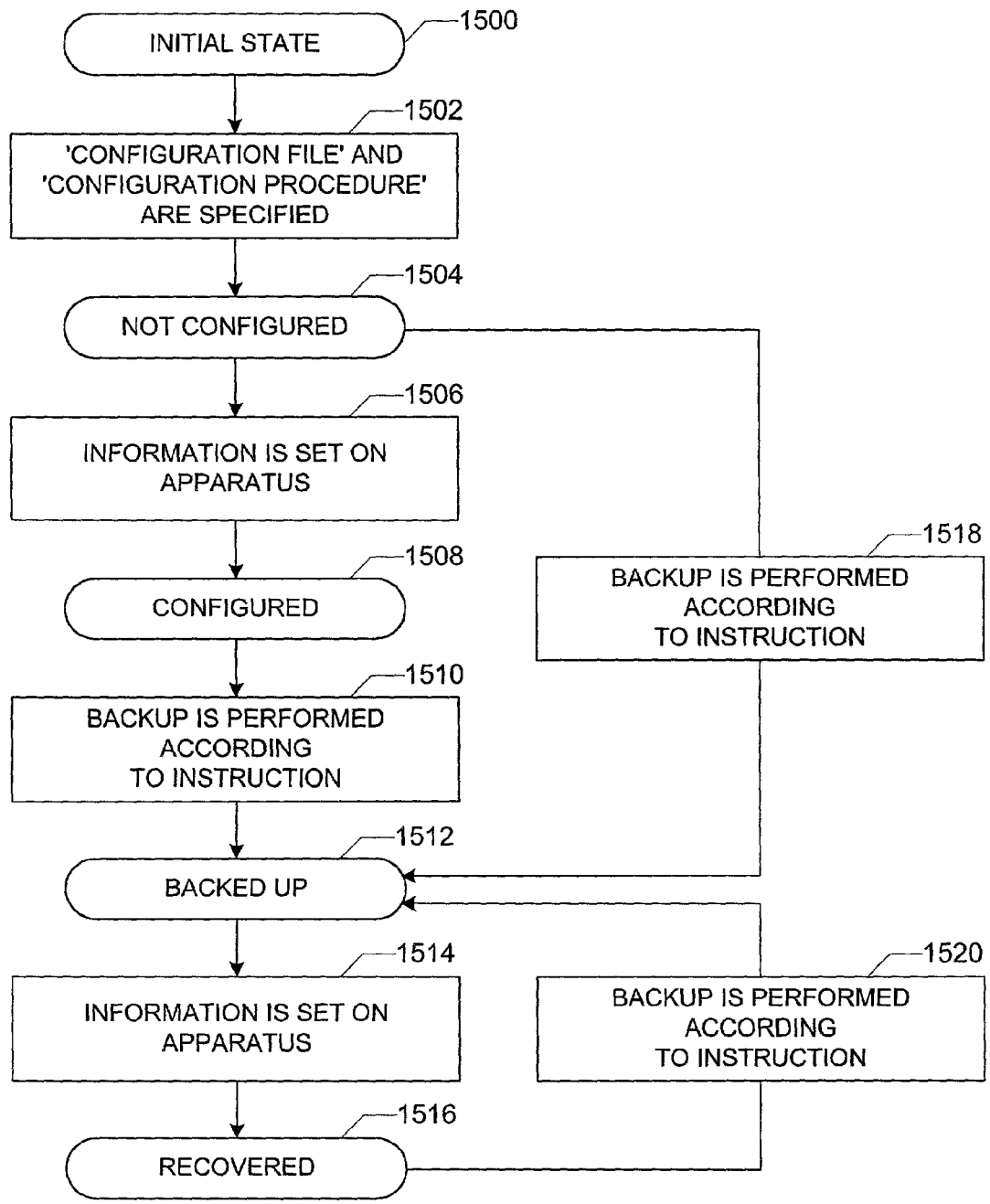
FIG. 14 is a flowchart illustrating states set in a "State" field of the management table of FIG. 3.

FIG. 14 is a flowchart illustrating the states set in the "State" field of one inventive embodiment. The "State" field serves to determine whether the configuration file is backed up, and enables an administrator of the management device 10 to grasp the status of the configuration/backup. One of five states may be set in the "State" field, and a transition is made as shown in FIG. 14.

An 'Initial state' 1500 is a state wherein neither a configuration file nor configuration procedure is specified, i.e., set in the management table 16. Thus, the controller 11 sets the configuration file and configuration procedure in the management table 16 in a flow stage 1502. In either of these states, when the configuration file and configuration procedure are specified, a transition is made to a 'Not configured' state 1504. Also, in either of these states, when the configuration file and configuration procedure are removed, a transition is made to the 'Initial state' 1500.

The 'Not configured' state 1504 is a state wherein the configuration file and configuration procedure are set in the management table 16 but have not yet been set on the network device 60. In that state 1504, the controller 11 sets the configuration file and configuration procedure on the network device 60 in a flow stage 1506. When the configuration file and configuration procedure are set on the network device 60, the "State" field of the management table 16 is changed to a 'Configured' state 1508. The 'Configured' state 1508 is a state wherein the configuration file and configuration procedure are set on the network device 60.

Next, according to an instruction in an "instruction" field of the management table 16 that will be described later, configuration information (or management table 16) is backed up in a flow stage 1510. When the configuration information is backed up, a 'Backed up' state 1512 is set in the "State" field. The 'backed up' state 1512 is a state wherein the management table 16 is backed up in accordance with an instruction in the "Instruction" field.

Next, information including the configuration file and configuration procedure that are backed up is set on the network device 60 in a flow stage 1514. This sets a 'Recovered' state 1516 in the "State" field. This 'Recovered' state 1516 is a state wherein the network device 60 is configured with configuration information that is backed up.

In some instances, backup may be performed in accordance with an instruction of the "Instruction" field from state 1504 to state 1512 in a flow stage 1518. Alternatively, backup may also be performed in accordance with an instruction of the "Instruction" field from state 1516 to state 1512 in a flow stage 1520. For example, when the management table 16 is backed up in the 'Not configured' state 1504, the state is changed into the 'Backed up' state 1512, and thereafter when the information is set on the network device 60, the state in the "State" field is changed to the 'Recovered' state 1516 rather than the 'Configured' state 1508.

The "Instruction" field indicates a backup method for configuration information of the network device 60. For example, a 'Periodical backup' means that the configuration file is periodically backed up at a specified time, while a 'Backup on change' means that the configuration file is backed up when the administrator changes the device settings.

The management device 10 may further have a subnet mask, a default gateway, a user ID and password, a hardware version, and firmware version included in the management table 16. The hardware version can be a version of the network device 60 hardware, and the firmware can be a version of the network device 60 firmware.

The management table 17 as shown in FIG. 3B is a management table common for each type of network device 60. The management table 17 is referred to when the configuration file is not set in the management table 16. In the management table 17, as shown, device type information of the network device 60, a configuration file common for each type of the apparatus, and a configuration procedure common for each type of the apparatus are correlated with each other. The management table 17, according to the present embodiment, is created before the management table 16 is created, and stored in the memory 15 before the network is activated. The management table 17 may be downloaded from resources on the Internet or copied from a CD-ROM.

The DHCP server 20 sets communication parameters on the network device 60. Such separate provision of the DHCP server 20 independent from the management device 10 is preferable to achieve distributed services of the DHCP server. The communication parameters can include the above-mentioned IP address, subnet mask, and default gateway.

The subnet mask is a bit pattern for separating the host address part of the IP address into the subnet address and the host address. When "255.255.255.0" is set in the subnet mask, the first three numbers are represented in binary notation as "11111111". A "1" in the subnet mask denotes the same network.

Unless the target IP address has the same network address as the host, the default gateway is an IP gateway through which a host transmits an IP datagram when the host for transmitting the IP datagram incorporates a routing table including a target IP address.

The user ID and password pair can serve as an identifier for preventing unauthorized use of the network device 60 in the network. The management device 10 may store information that was acquired in advance by offline means such as telephone, facsimile, or ordinary mail from the user of each network device 60 on the network device 60, or the information may be acquired when the configuration information is set at the network device 60.

The communication parameters may include cryptographic information (e.g., key information and encryption scheme information), and an address of the management device 10 for transmitting a notification that the network device 60 is abnormal (e.g., a trap signal for use with SNMP as will be described later).

It should be noted that the controller 11 could be configured to display the network structure of the Ethernet network 30 from information stored in the management table 16.

In one embodiment of the invention, the interconnecting device 30 comprises a router. The router is an interconnecting device for establishing connection between LANs or between LAN and WAN, and since any mechanism known in the art may be applied to the interconnecting device 30, a detailed description will be omitted herein. However, the router 30, as will be described further hereinafter, can serve to forward an initial setting request transmitted from the network device 60 to the router 30 to the management device 10. The router 30 is connected to the management device 10 and the DHCP server 20 via the Ethernet network 40. The interconnecting device 30 may include a wireless interconnecting device (e.g., an access point as an interconnecting device for wireless LAN).

The present embodiment uses the Ethernet network 40 as a typical LAN. The Ethernet network 40 is a LAN in a bus topology, and includes 10Base-T, 10Base-TX, Gigabit Ethernet, and the like. However, the present invention is not only applicable to the above, but also to other types of LAN (e.g., token ring), and networks other than LAN such as WAN, MAN (metropolitan area network), private network, the Internet, commercial dedicated lines network (e.g., America Online), and other networks.

The interconnecting device 50 can be configured to connect the network device 60 to the network 40, and can include a relay port 52 through which the network device 60 is connected. The interconnecting device 50 can comprise, for example, a hub, a switch, a router, other concentrators, a repeater, a bridge, a gateway device, a PC, or a wireless interconnecting device (e.g., an access point as a interconnecting device for wireless LAN). Identifying information of the interconnecting device 50 and a port identifier of the relay port 52 are indicated in the connection information in the management table 16.

Figure 4:
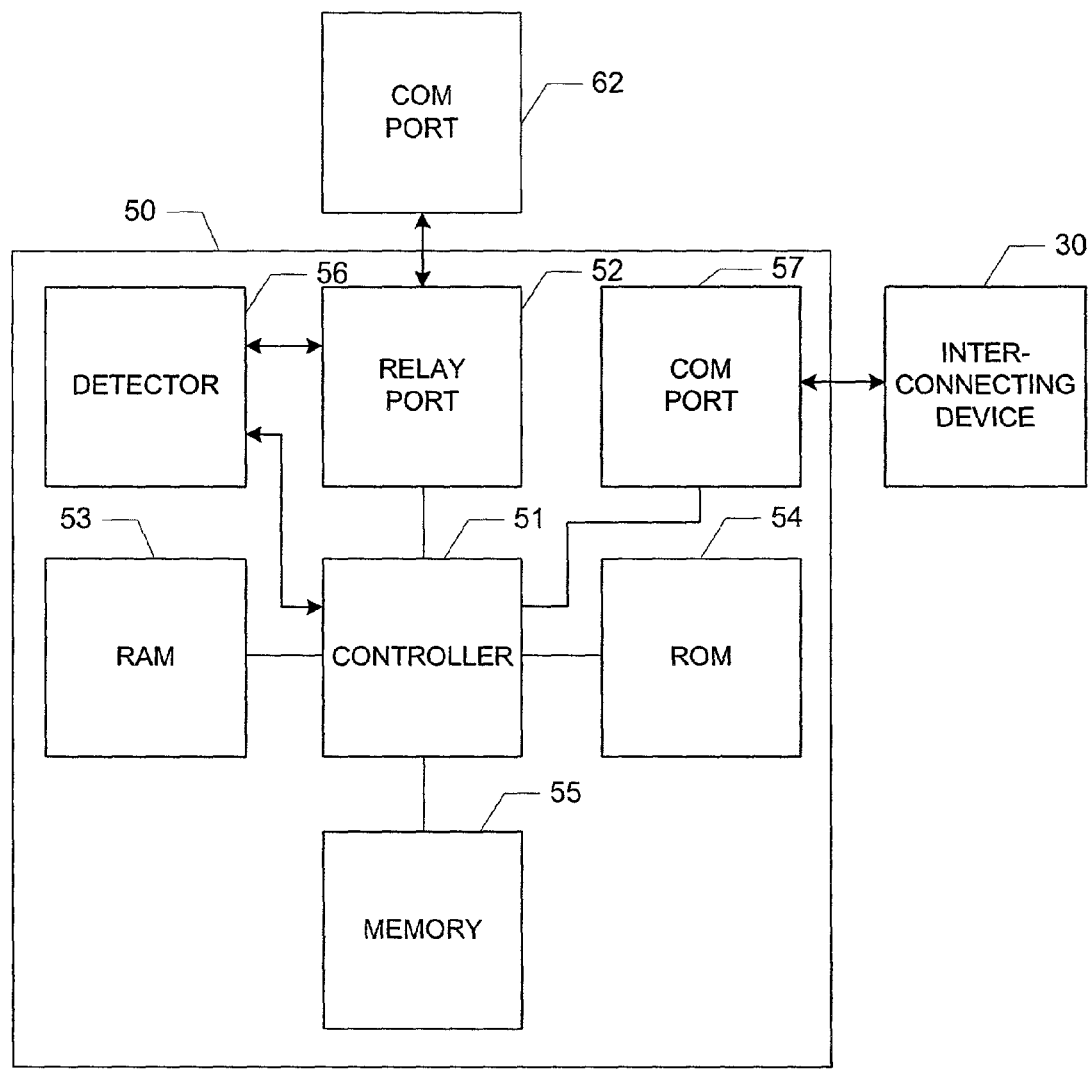
FIG. 4 is a block diagram of one embodiment of an interconnecting device with which the network device is connected in the network system as shown in FIG. 1.

FIG. 4 is a block diagram of the interconnecting device 50. The interconnecting device 50 comprises, as shown in FIG. 4, a controller 51, a relay port 52, a RAM 53, a ROM 54, a memory 65, a detector 56, and a communication port 57. In FIG. 4, the input and output devices and display device attached to the interconnecting device 50 are not illustrated for the sake of convenience. Through the input/output device, an operator of the interconnecting device 50 may input data of various kinds in the memory 55, and download software into the RAM 53, ROM 54, or memory 55.

The controller 51, which can be a processor such as a CPU, or an MPU, can be configured to control each section of the interconnecting device 50. The controller 51 can communicates with the detector 56, provide information for identifying the network device 60 to the management device 10, or relay management of the network device 60 by the management device 10.

The relay port 52 is a communication port through which the network device 60 can establish a cable connection. In the present embodiment, the management device 10 manages the network device 60 based upon the port identifier of the relay port 52, on the premise that the port identifier of the relay port 52 of the interconnecting device 50 will not change. However, the communication parameters may be changed when the network device 60 fails and/or is exchanged.

The RAM 53 serves to temporarily store data to be read from the ROM 54 or the memory 55, or data to be written in the memory 55, or the like. The ROM 54 serves to store various kinds of software for the controller 51 to operate, firmware, or other types of software.

Figure 8:
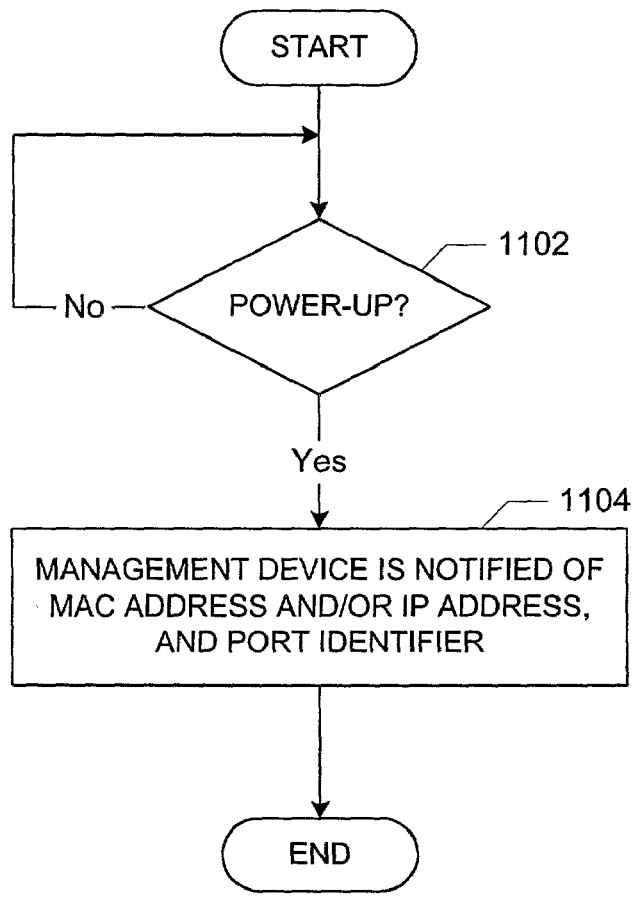
FIG. 8 is a flowchart illustrating one embodiment of a control method implemented by the interconnecting device in the network system of FIG. 1.

The memory 55, in conjunction with the present invention, serves to store a control method executed by the interconnecting device 50 as will be described later with reference to FIG. 8. This control method may be implemented as a program that can be distributed as an independent commodity. Accordingly, the program may be sold in a CD-ROM or other recordable media, or distributed and updated online via a network such as the Internet.

The detector 56 can detect power-up of the network device 60 by communicating with the relay port 52, and can notify the controller 51 of the power-up. The detector 56 may perform detection by comparing a voltage of the relay port 52 with a specific slice level, and many different well known structures may be used to implement the detector 56.

The communication port 57 may be a LAN adapter for connecting the interconnecting device 50 with the interconnecting device 30 or the Ethernet network 40, a USB port or IEEE 1394 port for providing connection to the Internet (via an Internet service provider (ISP)) via a modem, or a terminal adapter (TA) through the public telephone network, ISDN, or various types of dedicated lines. The interconnecting device 50 may communicate with the management device 10 through the communication port 57.

The network device 60 is a target device to be managed by the management device 10, and may include network devices such as a hub, a switch, a router, other concentrators, a repeater, a bridge, a gateway device, a PC, a server, and a wireless interconnecting device (e.g., an access point as a interconnecting device for wireless LAN).

Figure 5:
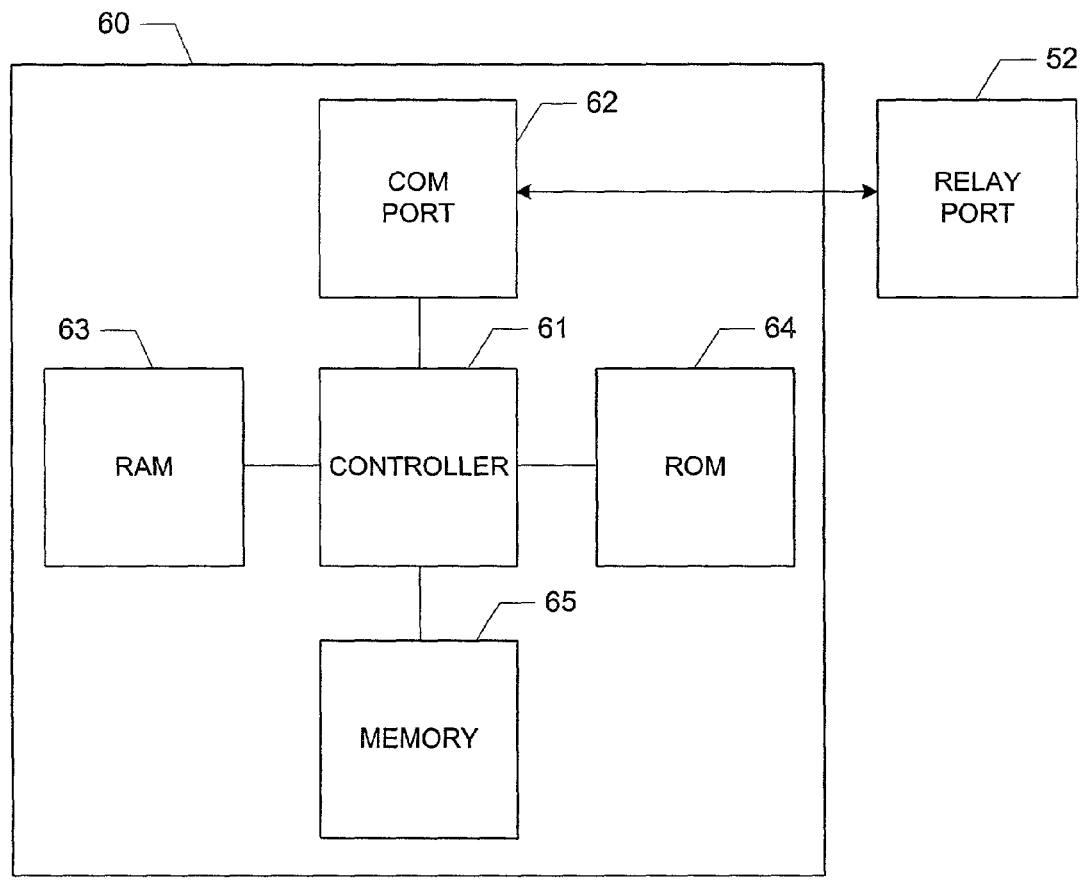
FIG. 5 is a block diagram of one embodiment of the network device of FIG. 1.

FIG. 5 is a block diagram of one embodiment of the network device 60. The network device 60, as shown in FIG. 5, comprises a controller 61, a communication port 62, a RAM 63, a ROM 64, and a memory 65. In FIG. 5, the input and output devices and display device attached to the network device 60 are not illustrated for the sake of convenience. Through the input/output device, an operator of the network device 60 may input data of various kinds in the memory 65, and download software into the RAM 63, ROM 64, or memory 65.

The controller 61, which can be a processor such as a CPU or an MPU, controls each section of the network device 60. The controller 61, in conjunction with the present invention, requests the DHCP server 20 to transmit communication parameters and stores the received communication parameters in the memory 65, transmits an initial setting request to the router 30, and communicates with the controller 11 of the management device 10.

The communication port 62 can be an interface connected with the relay port 52 of the interconnecting device 50. The RAM 63 serves to temporarily store data to be read from the ROM 64 or the memory 65, or data to be written in the memory 65 or the like. The ROM 64 serves to store various kinds of software for the controller 61 to operate, firmware, and other types of software. The memory 65 serves to store communication parameters and a setting program thereof. The setting program is a program that receives and sets communication parameters from the DHCP server.

Figure 6:
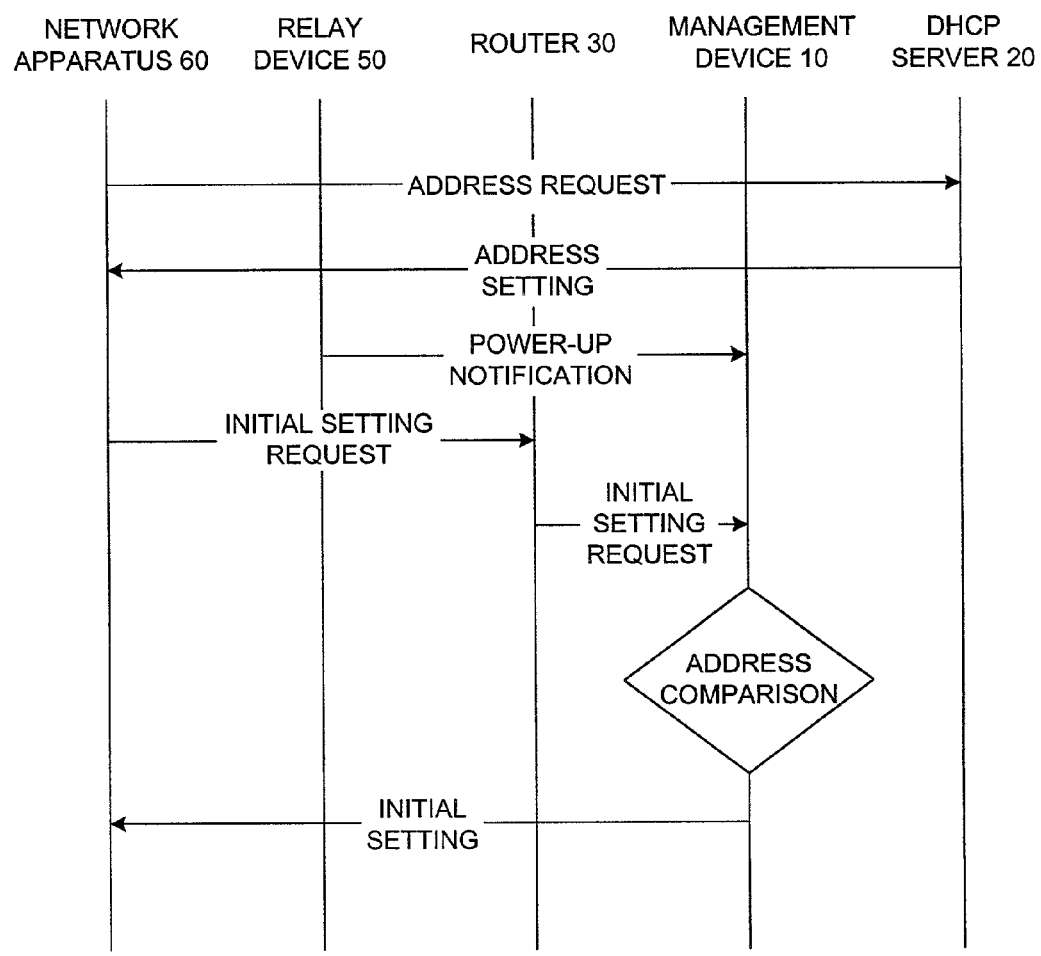
FIG. 6 is one exemplary timing chart of an initial setting operation by the network system as shown in FIG. 1.
Figure 7A:
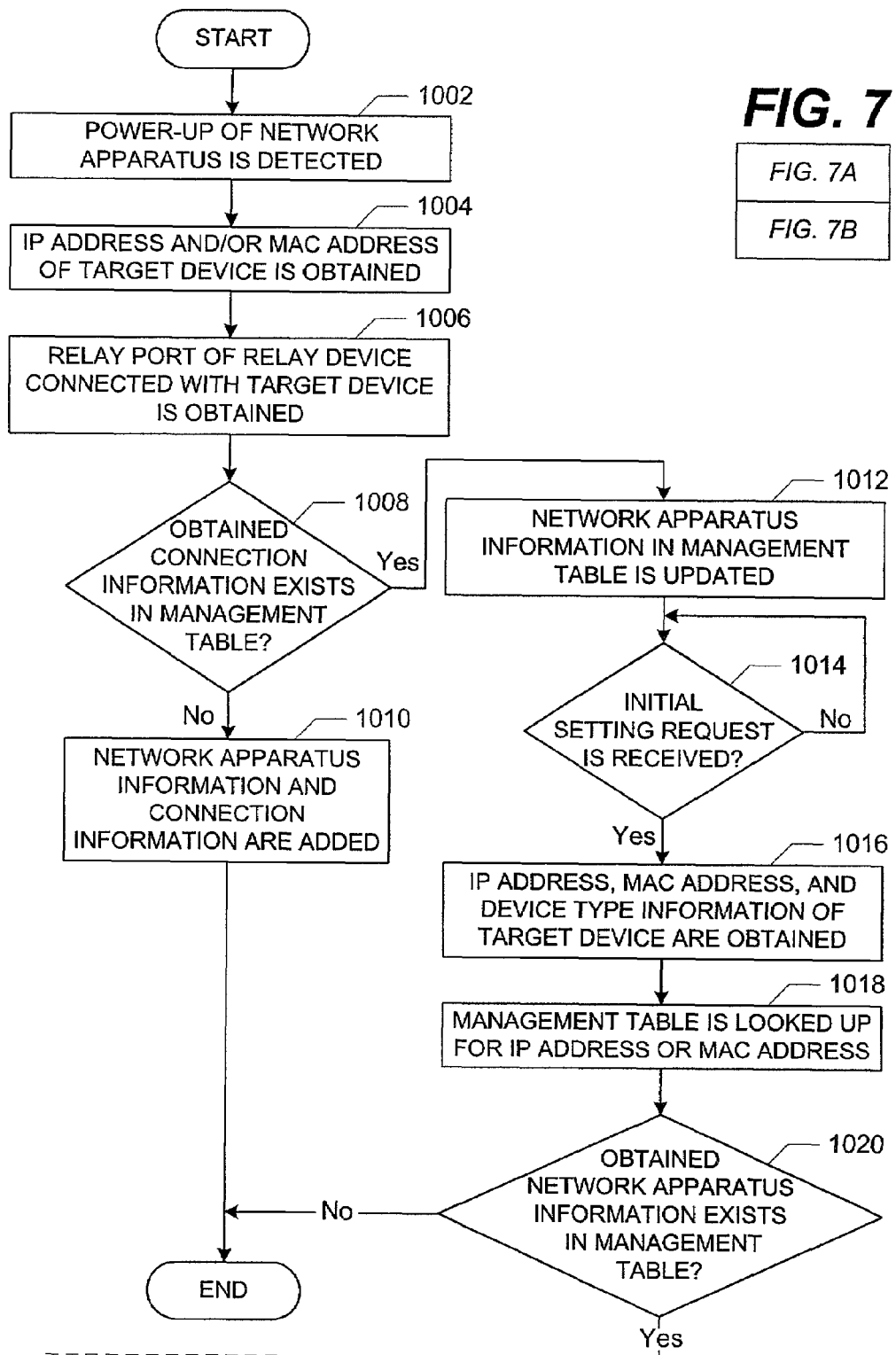
FIG. 7 is a flowchart illustrating one embodiment of a detailed operation of the management device as shown in FIG. 2 in the timing chart shown in FIG. 6.
Figure 7B:
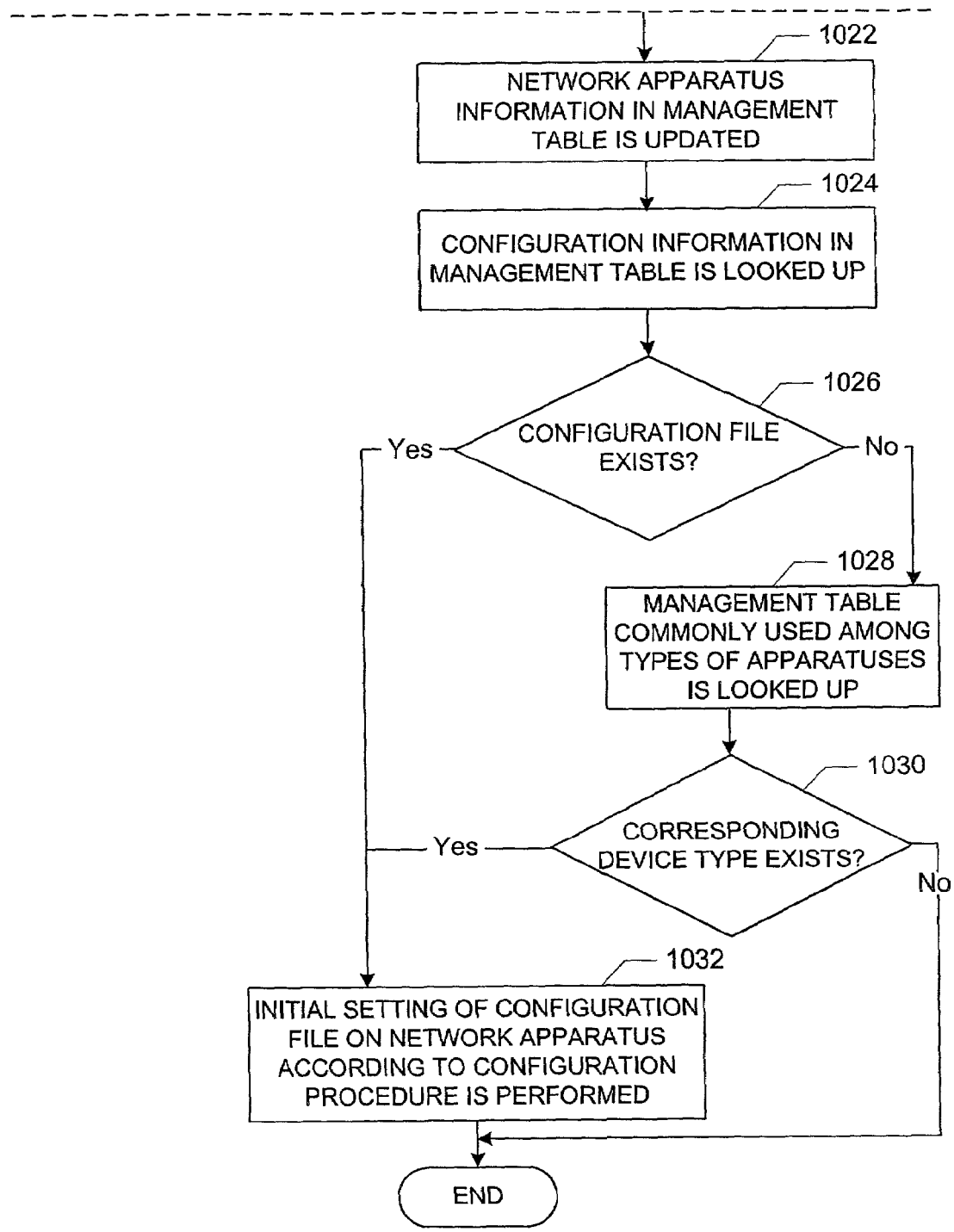

FIG. 6 is a timing chart of one embodiment of an initial setting operation of the network device 60 by the network system 1. A description will be given of an operation of the inventive network system 1 with reference to FIGS. 6 and 7. FIG. 7 is a flowchart illustrating a detailed operation of one embodiment of the management device 10 according to the timing chart shown in FIG. 6.

As indicated by the two topmost arrows in FIG. 6, first, the network device 60 requests the DHCP server 20 to transmit communication parameters with DHCP, for example, upon power-up, and the DHCP server 20, in response thereto, transmits and sets the communication parameters. The present invention is not limited to the above, but the network device 60 may use BOOTP or other protocols.

Concurrently, the detector 56 of the interconnecting device 50 (FIG. 4) communicates with the relay port 52, and thereby detects the power-up of the network device 60, and notifies the controller 51 of the detection. FIG. 8 is a flowchart illustrating a control method implemented by one embodiment of the interconnecting device 50. An operation of the interconnecting device 50 in this case is shown in FIG. 8. Figure First, the controller 51 determines whether the network device 60 connected with the interconnecting device 50 is powered on in a flow stage 1102 using a detection result of the detector 56. Next, the controller 51 receives a notification of the power-up from the detector 56, and if the controller 51 determines that the target device to be managed is powered on, the controller 51 notifies the management device 10 through the communication port 57 of the MAC address and/or IP address, and the port identifier of the relay port 52 in a flow stage 1104.

Accordingly, as indicated by the third arrow from the top in FIG. 6, the controller 51 of the interconnecting device 50 (FIG. 4) notifies the management device 10, through the communication port 57, of the power-up. Referring now to FIG. 7, the management device 10 detects the power-up of the network device 60 in a flow stage 1002, and the management device 10 obtains the MAC address or IP address of the network device 60 in a flow stage 1004. Next, in a flow stage 1006, the management device 10 obtains identifying information of the interconnecting device 50 with which the network device 60 is connected, and the port identifier of the relay port 52.

Next, the controller 11 of the management device 10 conducts a search and determines whether the obtained connection information exists in the management table 16 in a flow stage 1008. The controller 11, if determining that the connection information does not exist, adds network device information and connection information to the management table 16 in a flow stage 1010, and completes the process. Alternately, the controller 11, upon determining that the connection information does exist, updates (the history of) the network device information in the management table 16 in a flow stage 1012.

When the setting of the communication parameters is concluded, the network device 60 transmits the initial setting request to a predetermined default router 30, for example, with a trap message in SNMP that will be described later. In response, the router 30 forwards the setting request from the network device 60 to the management device 10. In this manner, the network device 60 transmits the initial setting request to the management device 10 through the router 30 in the present embodiment. This is because the network device 60 generally does not have information on an address of the management device 10 when the communication parameters are set. However, if the DHCP server 20 transmits the address of the management device 10 together with the communication parameters to the network device 60, the network device 60 may directly transmit the initial setting request to the management device 10.

The network device 60 may have device type information, and the above user ID, hardware version or the like, included in parameters for the initial setting request. This allows the management device 10 to perform an initial configuration procedure according to the device type, and to perform more refined management in the management that will be described later with reference to FIG. 13.

The controller 11 of the management device 10, upon determining that the initial setting request is received in a flow stage 1014, obtains the IP address, MAC address, and device type information of the network device 60 in a flow stage 1016. Next, the management device 10 compares the MAC address or IP address, obtained from the interconnecting device 50 upon power-up, with the MAC address or IP address obtained upon receipt of the initial setting request, and searches for an address that matches in a flow stage 1018. The controller 11, upon determining that the obtained network device information does not exist in the management table 16 (FIG. 3A), stops the process in a flow stage 1020. In that event, an error message or the like may be returned to the network device 60.

Alternately, the controller 11 of the management device 10, upon determining that the obtained network device information exists in the management table 16, updates (the history of) the network device information in a flow stage 1022. Next, in a flow stage 1024, the controller 11 looks up the configuration information in the management table 16. Next, in a flow stage 1025, the controller 11 determines whether the configuration file exists in the management table 16.

The controller 11, upon determining that the configuration file does not exist in the management table 16 in a flow stage 1026, looks up the management table 17 in a flow stage 1028. Next, in a flow stage 1030, the controller 11 determines whether a corresponding device type exists in the management table 17. The controller 11, upon determining that the corresponding device type does not exist in the management table 17 in flow stage 1030, concludes the process.

Alternately, the controller 11, upon determining in flow stage 1026 that the configuration file exists in the management table 16, and determining in flow stage 1030 that the corresponding device type exists in the management table 17, performs an initial setting of the configuration file on the network device 60 in accordance with the configuration procedures of the management table 16 or 17 in a flow stage 1032, and completes the process. The controller 11 performs an initial setting of the configuration file in the management table 17 on the network device 60, and thereby the management device 10 can perform minimum management of the network device.

As described above, the management device 10 in the present embodiment performs an initial setting of the network device 60 based upon the address and/or port identifier of the network device 60. More specifically, the initial setting is performed on the network device 60 identified by the address and/or port identifier in accordance with a predetermined configuration procedure. With the port identifier used as a key, the management device 10 can manage the network device 60 on the premise that a failure and replacement of the network device 60 may change communication parameters but will not change the port identifier of the relay port 52 in the interconnecting device 50, where the network device 60 has a one-to-one correspondence to the port identifier.

The controller 11 (FIG. 2) preferably inquires of a user in each flow stage as described above whether the network configuration should be displayed in a treelike chart, and displays the tree if the user indicates such.

Referring now to FIG. 9, a description will be given of a method of creating the management table 16 (FIG. 3A) by the management device 10 (FIG. 2). First, in a flow stage 1302, the controller 11 obtains the network device information including the MAC address and IP address of the network device 60, and the device type information that indicates the type of the network device. The method of obtaining network device information may be linked with the power-up detection by the interconnecting device 50, or the information may be obtained from the DHCP server 20 as will be described later.

Next, in a flow stage 1304, the controller 11 obtains connection information including the identifying information and port identifier.

Figure 11:
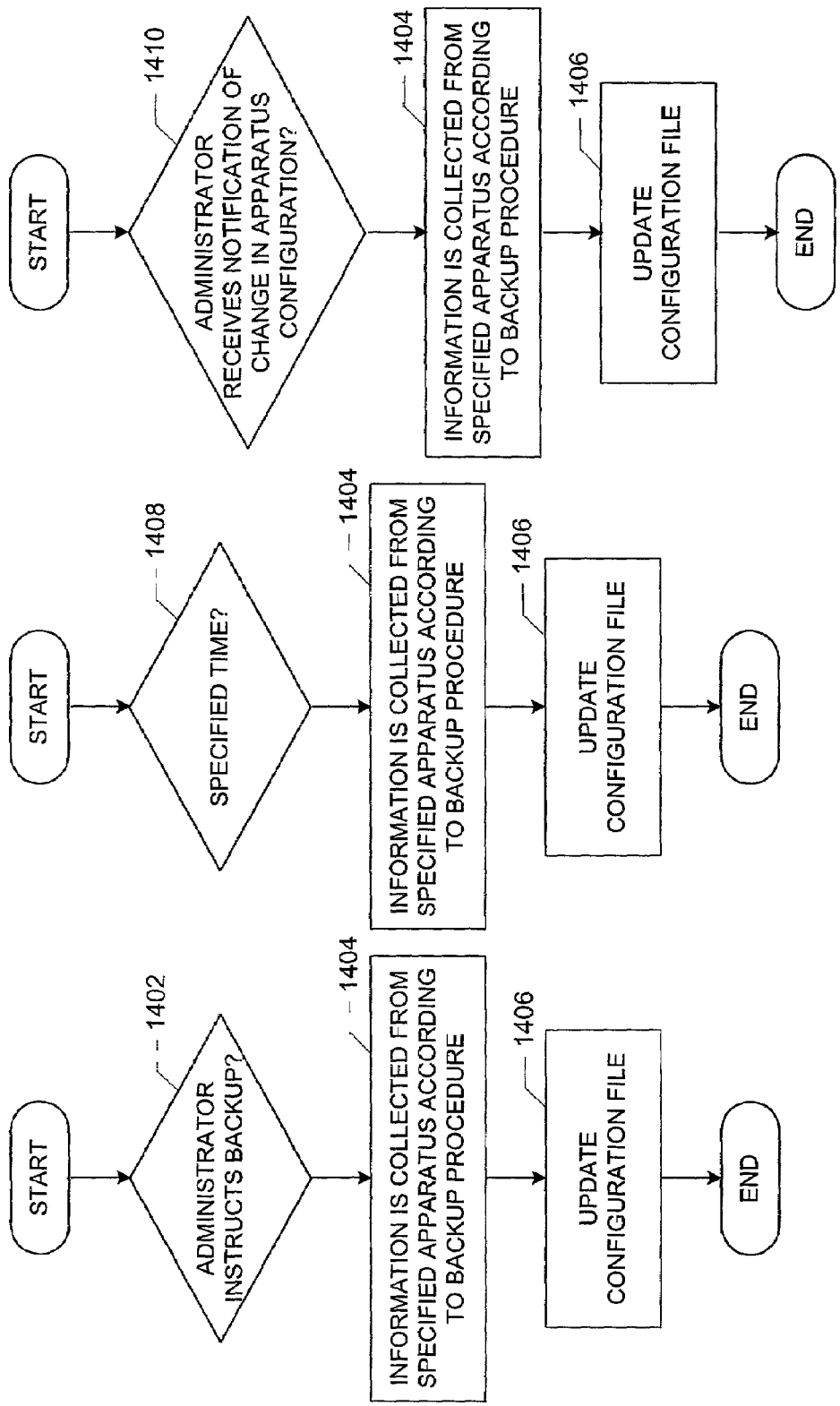
FIG. 11 is a flowchart illustrating an information backup method on the network device implemented by the management device of FIG. 2.

In a flow stage 1306, the controller 11 can then obtain configuration information for managing the network device, i.e., a configuration file, a configuration procedure, or a state and instruction. As described above, the configuration file and configuration procedure may be copied from those which have been combined and stored in another area of the memory 15 in advance. The state and instruction fields may be entered by an administrator of the management device 10 when the corresponding network device information or the like is combined. A method of updating the configuration file in accordance with an instruction entered in the instruction field will be described with reference to FIG. 11.

Thus, the management table 16 as shown in FIG. 3A is created in a flow stage 1308. Consequently, as described above, the administrator of the management device 10 may manage the Ethernet network 40 at one location.

Next, a description will be given of a variation of the embodiment shown in FIG. 6 with reference to FIG. 10. In the present embodiment, the management device 10 communicates the DHCP server 20 periodically or in a predetermined condition, and receives an IP address and/or MAC address, and an initial setting request from the DHCP server 20. Since the DHCP server 20 recognizes that an initial setting on the network device 60 may be performed by the management device 10 after communication parameters are set on the network device 60, the DHCP server 20, instead of the network device 60, requests the management device 10 to perform the initial setting on the network device 60. Accordingly, in that event, the management device 10 compares the MAC address or IP address received from the DHCP server 20 with the MAC address or IP address obtained by the power-up notification from the interconnecting device 50.

The configuration information may be backed up in preparation for a future opportunity for replacement of the apparatus, or periodically. Alternatively, the configuration information may be backed up upon notification of change in the configuration information from the network device 60. Optionally, a history of backup information may be managed in preparation for recovery necessitated by a configuration mistake or the like.

FIGS. 11A-C illustrate several methods for updating configuration information when a predetermined condition is satisfied, wherein FIGS. 11A through C differ in terms of the predetermined condition.

Referring to FIG. 11A, in a flow stage 1402, the controller 11 (FIG. 2) determines whether an administrator has entered a backup instruction, and upon determining that the instruction has been entered, collects information from the specified apparatus according to a backup procedure in a flow stage 1404, and updates the configuration file in a flow stage 1406.

Referring to FIG. 11B, in a flow stage 1408, the controller 11 (FIG. 2) determines whether a specified time has passed, and upon determining that the time has passed, collects information from the specified apparatus according to the backup procedure in a flow stage 1404, and updates the configuration file in a flow stage 1406. The specified time may be specified by the administrator in advance. When the method as shown in FIG. 11B is adopted, the controller 11 writes 'Periodical backup' into the "Instruction" field in the management table 16.

Referring to FIG. 11C, in a flow stage 1410, the controller 11 (FIG. 2) determines whether a notification that the user of the network device 60 has changed the apparatus configuration of the network device 60 is received from the network device 60, and upon determining that the notification is received, collects information from the specified apparatus according to the backup procedure in a flow stage 1404, and updates the configuration file in a flow stage 1406. When the method as shown in FIG. 11C is adopted, the controller 11 writes 'Backup upon change' into the "Instruction" field in the management table 16 (FIG. 3A).

When the backup process is complete, the controller 11 updates the "State" field in the management table 16 to 'Backed up'.

Using the information backed up as described above, an initial setting may be performed upon failure and replacement of the network device 60, so that the network device 60 may retain the setting, before replacement, unchanged.

The network device 60 may be configured such that no second initial setting is required when the first initial setting has been appropriately performed. This may be realized because the network device 60 stores the initial configuration information in the memory 15. The management table 16 may be stored in the ROM 14 as a nonvolatile memory as described above. This may prevent unnecessary processes for address assignment and initial setting from being required.

Figure 10:
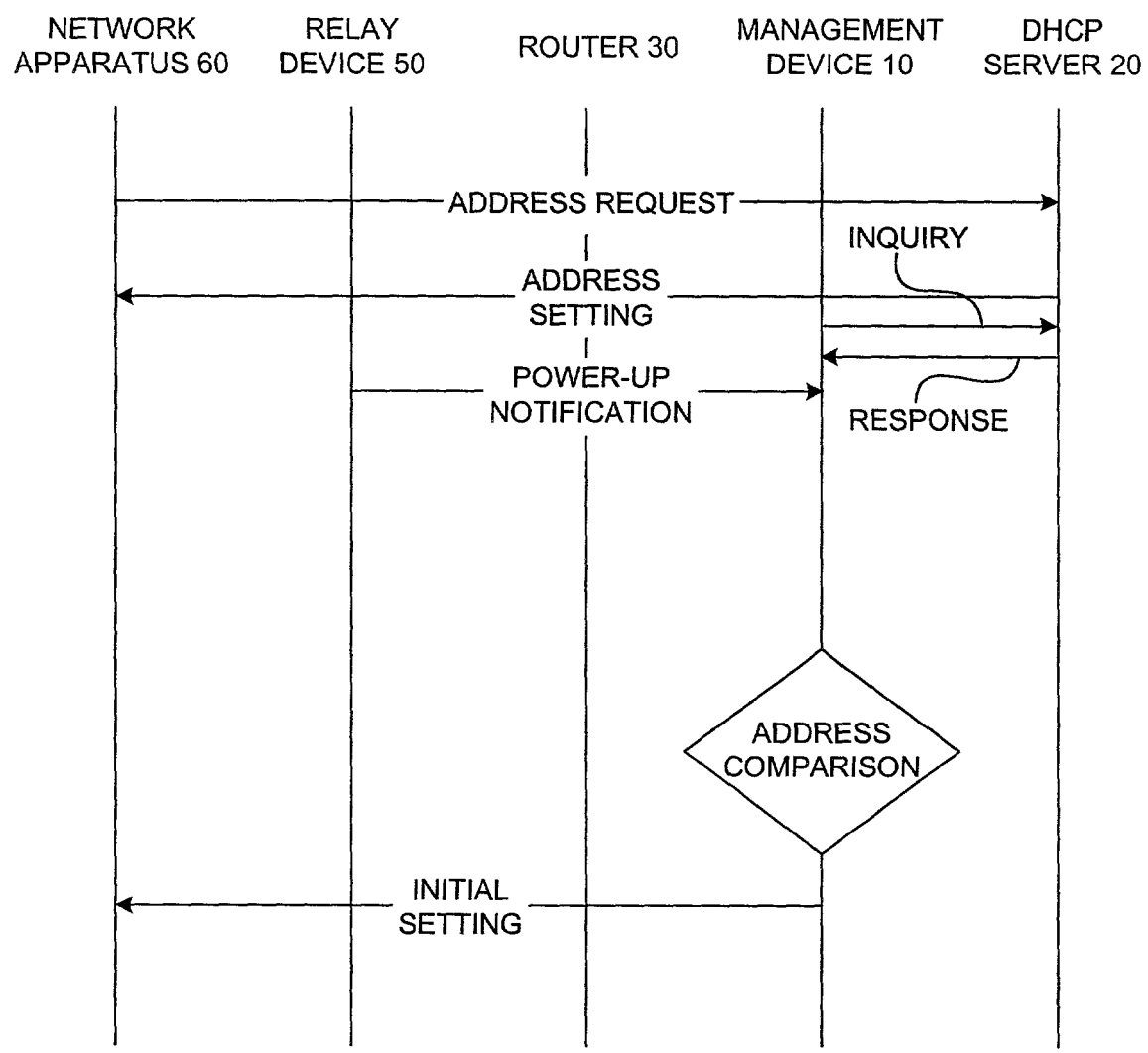
FIG. 10 is a variation of the timing chart shown in FIG. 6.

In that event, the network device 60 does not transmit an initial setting request to the router 30 in FIG. 6, and the DHCP server does not transmit the initial setting request to the management device 10 in FIG. 10. In FIG. 6, the controller 61 of the network device 60 determines, before transmitting the initial setting request whether the initial setting has already been performed, and if determining that the initial setting has already been performed, then controls each section not to transmit the initial setting request, and if determining that the initial setting has not been performed yet, then controls each section to transmit the initial setting request. Such control may be exercised, for example, by setting the configuration file. In FIG. 10, a controller (not shown) of the DHCP server 20 may link the communication parameter request by the network device 60 with the initial setting request.

Figure 12:
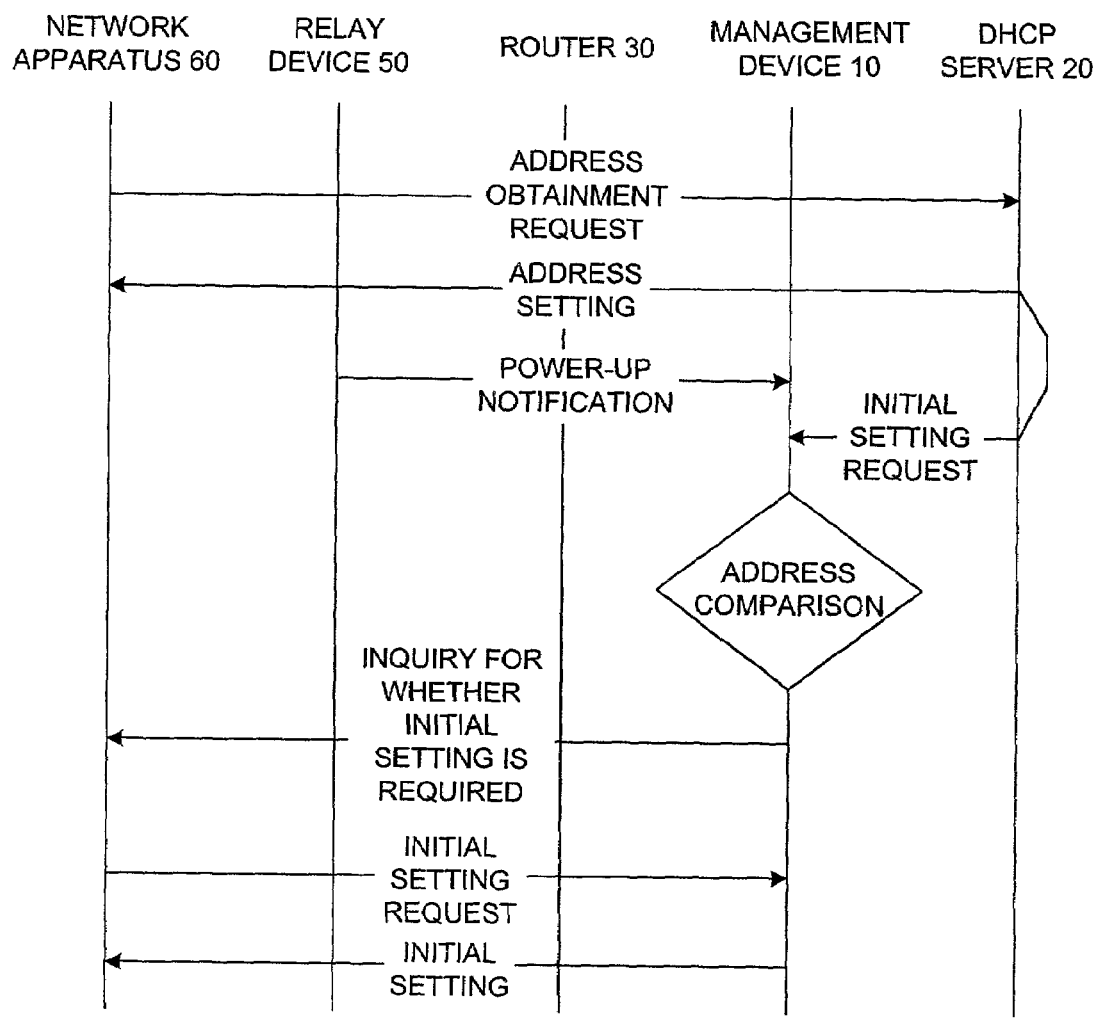
FIG. 12 is another variation of the timing chart shown in FIG. 6.

FIG. 12 is a flowchart illustrating yet another variation of the timing chart illustrated in FIG. 6. The present embodiment differs from the embodiment in FIG. 6 in that the management device 10 addresses an inquiry to the network device 60 after the DHCP server 20 has assigned an address and requested the initial setting to the management device 10. Although it is not determined whether the network device 60 is expected to perform an initial setting in the embodiment shown in FIG. 10, an inquiry is addressed from the management device 10 to the network device 60 in the present embodiment to offset this fault. The network device 60 responds to the initial setting request from the management device 10 when an initial setting is necessary, for example, upon initial installation or trouble, but does not respond when the initial setting is unnecessary. Whether the initial setting is necessary or not may be altered with a switch attached to the management device 10 or the network device 60. Since other operations are the same as in FIG. 6, a detailed description will be omitted herein.

Figure 13A:
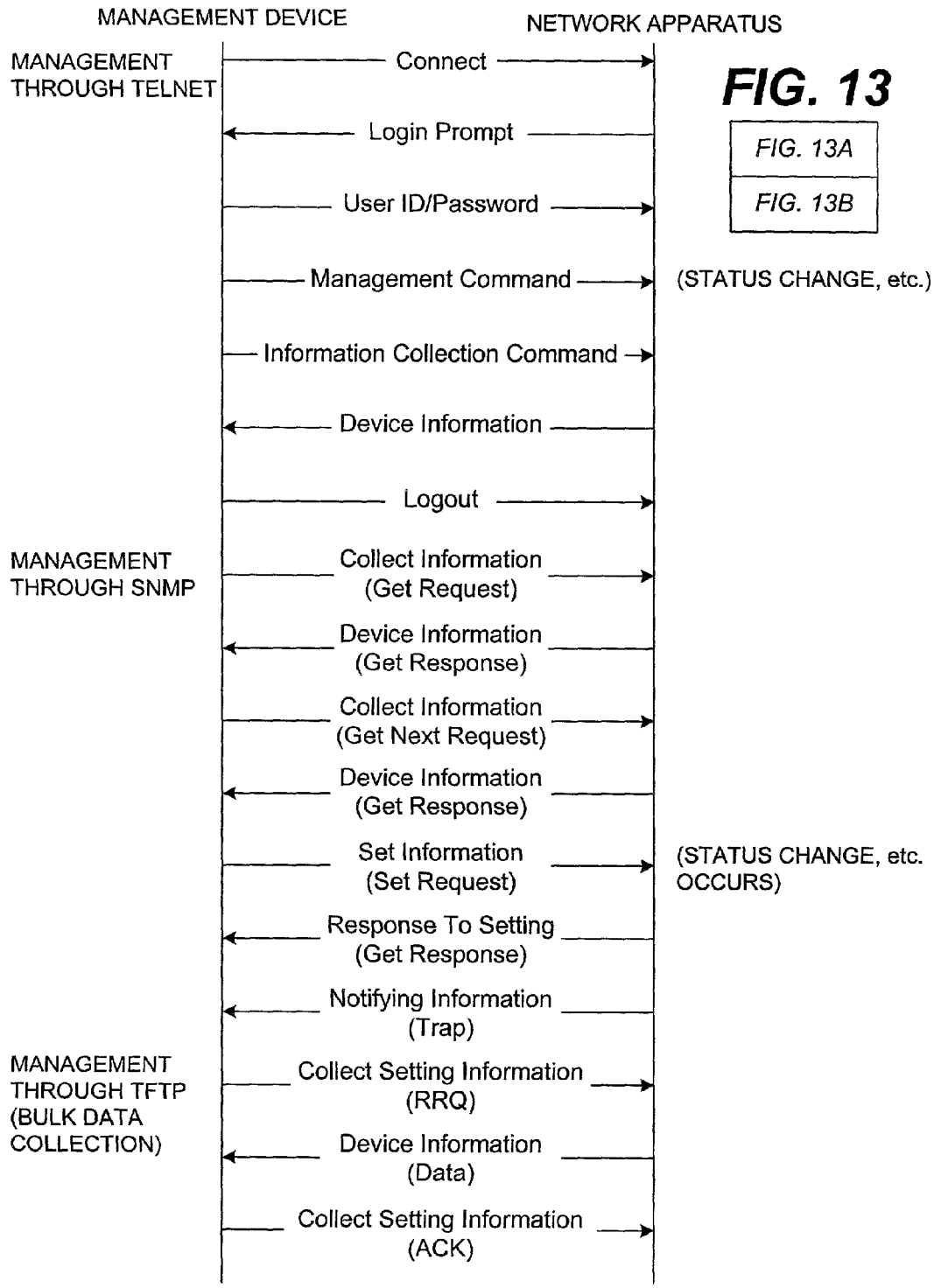
FIG. 13 is a timing chart illustrating a management operation of the network system of FIG. 1.
Figure 13B:
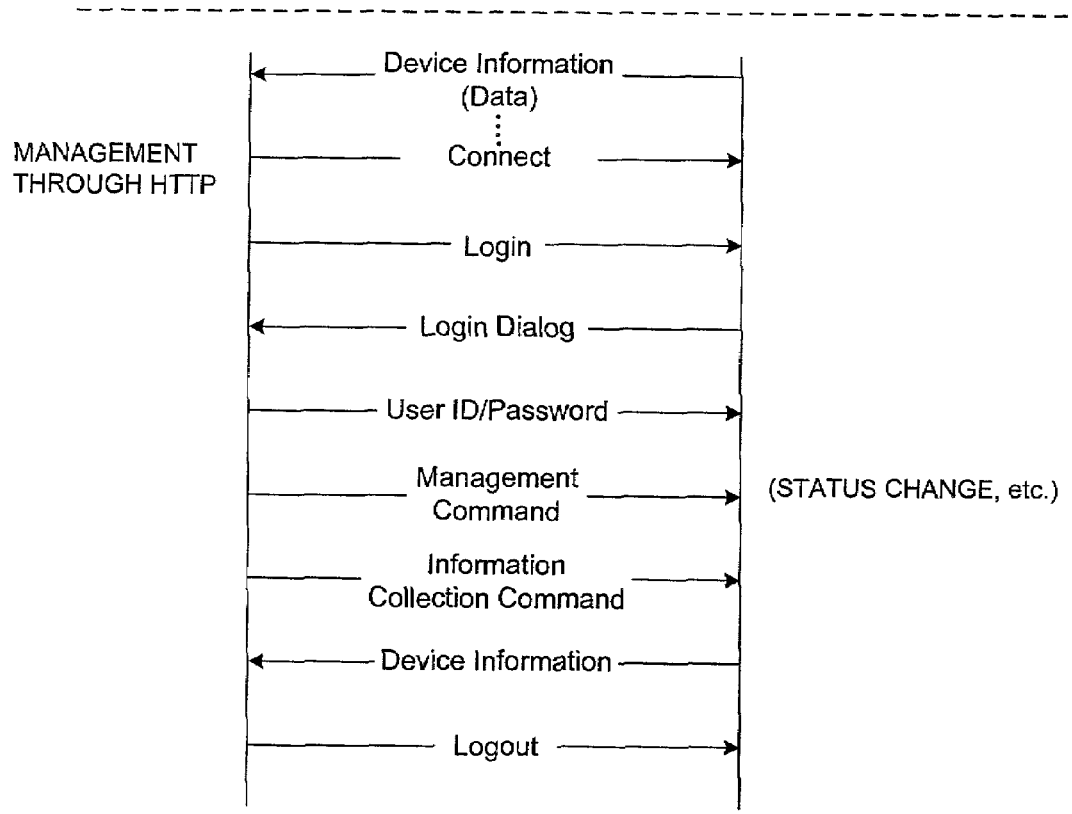

FIG. 13 is a timing chart illustrating one embodiment of the management operation of the network system 1. As shown in FIG. 13, the management device 10 (FIG. 2) of one embodiment performs management through TELNET, SNMP, TFTP, that is, bulk data collection, and management through HTTP (Hypertext Transfer Protocol).

First, the management device 10 communicates with the network device 60 using TELNET. TELNET is a protocol that allows communication between the management device 10 and the network device 60 on a TCP/IP network. The management device 10, like a server such as on UNIX, connects with the network device 60, and invites an administrator to enter a user ID and password in response to a login prompt from the network device 60 to login to the system of the network device 60. Next, the management device 10 allows the administrator to enter a management command and an information collection command in accordance with displayed messages, and the network device 60 transmits the apparatus information in response.

In the present embodiment, the management device 10 performs management using SNMP, a standard protocol for the TCP/IP network management. In operation, SNMP uses four types of messages: (1) get (for collecting management information); (2) get-next (for collecting management information); (3) set (for setting management information); and (4) trap (for notifying a failure). Normally under SNMP, a GUI (Graphical User Interface) application is launched in the management device 10, and if information is required as a result of the operation, the information obtained by transmitting a GetRequest or GetNextRequest message, and received as a GetResponse message, is displayed on screen. If configuration is required, a SetRequest message is issued and a setting result is received with a GetResponse message. If status conditions in the network device 60 have changed, the network device 60 independently transmits a trap signal to the management device 10, and the management device 10 displays a message therefor.

TFTP transmits and receives mainly configuration information and firmware of the network device 60 in the form of a file. For example, the configuration information is collected as a file, and if the network device 60 fails, the file is transmitted by return and used when the original configuration information should be restored.

Under HTTP, HTML (Hypertext Markup Language) documents are transmitted and received between the management device 10 and the network device 60. The operation in HTTP is almost the same as in TELNET, but the human interface is based upon a Web page, rather than a command prompt, and thus a user may operate the management device 10 by selecting at his/her discretion a graphical element such as an icon or window displayed on the screen using a pointing device.

If the network device 60 is identified as an unauthorized device, the management device 10 refuses the login as necessary, and transmits an HTML document to notify the network device 60 to that effect, and records the event.

According to the network system 1 of the present embodiment, a predetermined initial setting may be set only by power-up of the network device 60. Since the network device 60 may be identified by (the port identifier of) the relay port 52 of the interconnecting device 50, the inventive system may be applied to a network environment with different types of apparatuses, and a different configuration procedure may be set to each type of the apparatus. The configuration information of the network device 60 may be backed up, and thus replacement of the network device 60 may be handled automatically. In this case, an administrator does not have to enter the MAC address or other identifiers of the apparatus. Moreover, according to the network system 1 of the present embodiment, management information unique to the network device 60 may be set.

Although certain embodiments of the present invention have been described above, various modifications and changes may be made in the present invention without departing from the spirit and scope thereof.

According to one aspect of the management method and system of the present invention, using a port identifier corresponding to each network device on a one-to-one basis, the network device may be initialized and managed easily, namely, without burdensome manual entry.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes which come within the meaning and range of equivalency of the claims are to be embraced within their scope.

What is claimed is:

1. A method of managing a target device with a management device comprising management information, wherein the target device and the management device are connected to a network, and wherein the target device is further connected to a port of a first interconnecting device, the first interconnecting device being connected to the network, and wherein the target device is further connected to a second interconnecting device, the second interconnecting device being also connected to the management device, the method comprising:
- the management device updating the management information after obtaining from the first interconnecting device:
  - an address of the target device;
  - identifying information of the first interconnecting device; and
  - a port identifier configured to identify the port of the first interconnecting device to which the target device is connected;
- the target device sending an initial setting request and the address of the target device to the second interconnecting device;
- the second interconnecting device sending the initial setting request and the address to the management device;
- the management device determining that the address of the target device sent by the second interconnecting device is included in the updated management information; and
- the management device sending initialization data to the target device, the initialization data being configured to initialize the target device.

2. The method of claim 1, wherein the management information comprises:
- network apparatus information comprising device type information indicative of a type of the target device and the address of the target device;
- connection information comprising identification information of the first interconnecting device and the port identifier; and
- configuration information configured to manage information in the target device.

* * * * *

UNITED STATES PATENT AND TRADEMARK OFFICE
CERTIFICATE OF CORRECTION

| | |
|---|---|
| PATENT NO. | : 7,277,935 B2 |
| APPLICATION NO. | : 10/160279 |
| DATED | : October 2, 2007 |
| INVENTOR(S) | : Takayuki Sato |

It is certified that error appears in the above-identified patent and that said Letters Patent is hereby corrected as shown below:

Column 7, Line 26, Delete "MIB-IL" and insert -- MIB-II --, therefor.
Column 9, Line 55, Delete "10Base-TX," and insert -- 100Base-TX, --, therefor.
Column 10, Line 1, Delete "a" and insert -- an --, therefor.
Column 11, Line 51, After "Figure" insert -- . --.

Signed and Sealed this
Fifteenth Day of March, 2011

David J. Kappos
*Director of the United States Patent and Trademark Office*